United States Patent

[11] 3,543,701

| [72] | Inventor | Arthur John Doner<br>Kearny, New Jersey |
|---|---|---|
| [21] | Appl. No. | 791,244 |
| [22] | Filed | Jan. 15, 1969 |
| [45] | Patented | Dec. 1, 1970 |
| [73] | Assignee | Resources Control Corporation<br>North Plainfield, New Jersey<br>a corporation of Delaware |

[54] PORTABLE INCINERATOR
7 Claims, 4 Drawing Figs.

[52] U.S. Cl. ................................................. 110/8
[51] Int. Cl. ................................................. F23g 5/12
[50] Field of Search ..... ....................................... 110/8,
8(C), 18, 18(A)

[56] References Cited
UNITED STATES PATENTS

| 2,847,951 | 8/1958 | Triggs | 110/8 |
| 2,993,454 | 7/1961 | Hebert | 110/8 |
| 3,048,130 | 8/1962 | Morgan | 110/8 |
| 3,082,714 | 3/1963 | Close | 110/8 |
| 3,089,440 | 5/1963 | Morgan | 110/8 |

*Primary Examiner*—Kenneth W. Sprague
*Attorney*—Amster & Rothstein

ABSTRACT: A compact incinerator suitable for use close to a source of refuse is constructed with primary and secondary combustion chambers so as to reduce the quantity of contaminants released into the atmosphere. Both the primary and secondary combustion chambers are fired from a single flame source by means of a flame conduit which passes through the primary combustion chamber and opens into the secondary combustion chamber. In a preferred embodiment of the invention the flow path of combustion products generated in the primary chamber includes a water impingement surface for collecting fly ash and other contaminant materials prior to entrance into the secondary combustion chamber.

Patented Dec. 1, 1970

INVENTOR.
ARTHUR JOHN DONER

Amster & Rothstein
ATTORNEYS

Patented Dec. 1, 1970

INVENTOR.
ARTHUR JOHN DONER

Ametir & Rothstein
ATTORNEYS

PORTABLE INCINERATOR

This invention relates generally to waste incineration and more specifically to a compact portable incinerator designed to limit the quantities of contaminants released into the atmosphere.

In the interest of efficiency and economy, industrial rubbish and other combustible waste materials are preferably incinerated close to their source, thus keeping carting and handling costs at a minimum and eliminating accumulations of waste at the source site. The desirability of local incineration has created a need for a compact, efficient and preferably portable incinerator which can be operated adjacent to a source of waste material without seriously affecting the immediate environment. Conventional incinerators generally release a variety of contaminants including soot, fly ash, smoke and the like into the atmosphere and cannot be used in close proximity to populated areas. Consequently, waste is frequently incinerated at a remote location requiring carting from the location at which the rubbish is accumulated to an incineration area.

Attempts to produce incinerators which release reduced quantities of pollutants have generally been confined to large incineration plants. These, due to size and cost, cannot be installed close to the source of refuse. Such large incineration facilities usually include a main combustion chamber in which essentially all combustion of waste material occurs in secondary chamber in which combustion products are burned off. Each member chamber is generally fired by a separate flame source and thus the installation requires two or more burners which substantially add to the fuel cost of operating such a facility.

It has heretofore been difficult to incorporate the advantages of primary and secondary combustion in an economical compact portable incinerator suitable for use in close proximity to a source of industrial or municipal refuse.

It is thus an object of the present invention to provide a compact portable incinerator which reduces the quantities of combustion products released into the atmosphere. A further object of the present invention is the reduction of pollutants in a compact efficient incinerator requiring only a single flame source to burn products in both primary and secondary combustion chambers. Another object of the invention is to provide a compact incinerator with a water impingement surface to trap certain combustion products and prevent their release into the atmosphere.

In accomplishing these and other objects and in accordance with the present invention, a compact incinerator is provided which is fired by a single flame source and which includes a chassis defining a primary combustion chamber for igniting waste material and a combustion product flow path including a secondary combustion chamber for igniting combustion products from the primary chamber. The secondary chamber communicates at one of its ends with the primary combustion chamber and at its other end with an exhaust flue. In order to fire both chambers, a single burner directs a flame into a flame conduit which passes through the primary combustion chamber and opens into the secondary combustion chamber beneath the exhaust flue. The flame conduit heats to a high temperature igniting waste material deposited in the primary combustion chamber. The open flame which passes into the secondary chamber both ignites combustion products and creates a draught which draws combustion products into the secondary chamber from the primary chamber.

In a preferred embodiment of the invention a water impingement surface is provided between the primary and secondary chambers and the flow path of combustion products is arranged so as to impinge onto the water surface thereby trapping fly ash and other debris in the water. Additionally, the flame conduit preferably traverses the primary combustion chamber at its lower end and includes deflecting means intermediate the main volume of the primary chamber and the flame conduit to direct debris away from the conduit and onto a grate communicating with an ash drawer below the primary chamber. Additionally, the primary combustion chamber includes an air duct running adjacent to the flame conduit and opening into the secondary combustion chamber for delivering preheated air to support combustion in the secondary combustion chamber.

The above brief description, as well as further objects, features and advantages of the present invention, will be more fully appreciated by reference to the following detailed description of an illustrative embodiment in accordance with the present invention taken in conjunction with the accompanying drawings, wherein.

Figure 1:
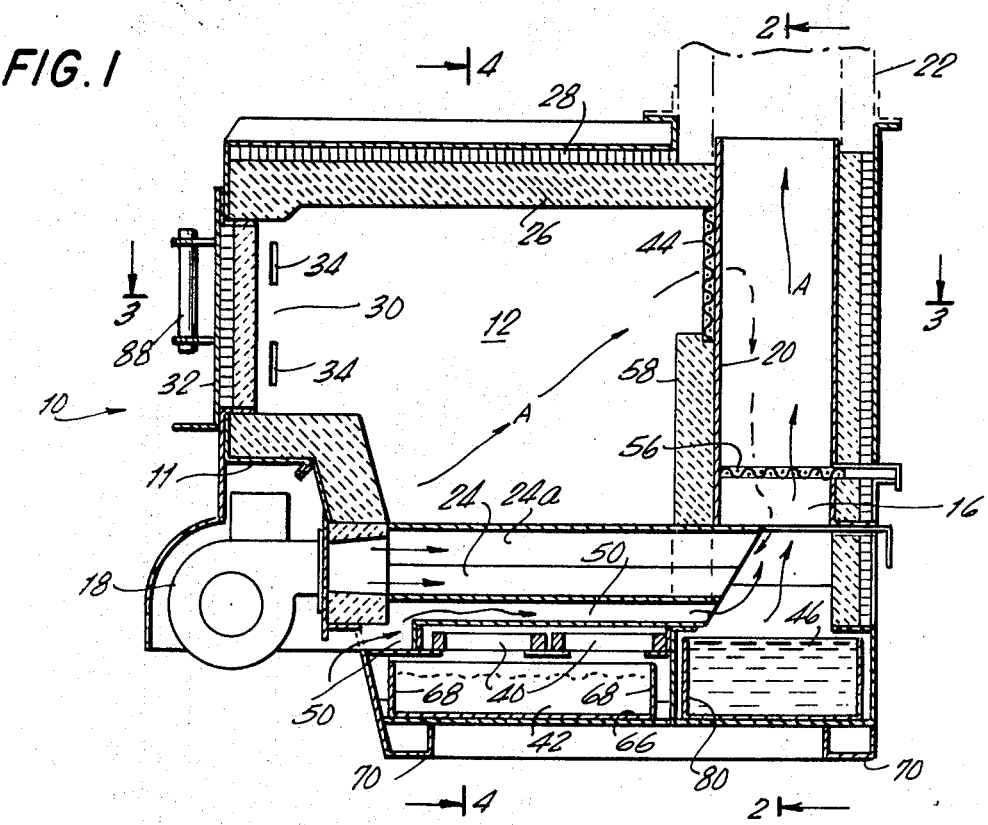
FIG. 1 is a partially broken away cross-sectional view of a compact portable incinerator constructed in accordance with a preferred embodiment of the invention.

Referring to the annexed drawing, the incinerator 10 is designed to be compact so that it may be operated close to the source of refuse rather than requiring substantial quantities of refuse to be carted from a refuse source to a central incineration point. Additionally the incinerator is relatively light in weight so that it may be moved from location to location. In many situations, this procedure is significantly more economical than standard prior arrangements. At the same time, the incinerator 10 is designed to substantially limit the quantities of fly ash and other combustion products released into the atmosphere and thus may be used in industrial locations without adversely affecting normal working conditions and may be used in urban areas without contributing to air pollution.

Generally, and in accordance with the invention, incinerator 10 comprises a chassis 11 defining a primary combustion chamber 12 for receiving and burning refuse. Combustion in the primary chamber generates combustion products such as soot, fly ash and smoke which are drawn through a combustion product flow path designated by arrow A into a secondary combustion chamber 16 where they are further ignited. For economy and compactness both the primary and secondary combustion chambers are fired by a single burner 18 which forces flame into a flame conduit 24 transversing the lower end of the primary combustion chamber 12 and opening into the secondary combustion chamber 16 beneath a flame tube 20 and flue 22. Flame thus exits the flame conduit, entering at the lower end of secondary combustion chamber 16 igniting combustion products in the secondary chamber and creating a strong updraft through flue 22 which serves to draw combustion products into the secondary combustion chamber from the primary combustion chamber, along the flow path.

A significant aspect of the present invention resides in the arrangement of primary and secondary combustion chambers both heated by a single flame source and the arrangement of the combustion product flow path so as to produce a continuous flow of combustion products and gases from the primary combustion chamber through the secondary combustion chamber.

Referring now to the details of construction, the primary combustion chamber 12 has upper, and sidewalls of refractory material such as castable fire brick 26 surrounded by insulation 28 which serves to maintain the high temperatures required for incineration. Access to the primary combustion chamber 12 from the exterior thereof is through an entry opening 30 which is covered by a double-leaf charging door 32 shown in closed position. The door is mounted on hinges 86 and is preferably arranged in a vertical plane so that it is not directly over the burning waste material. The charging doors are further provided with handles 88 to permit easy opening.

Burning in the primary combustion chamber is maintained by a flame source 18 which may be a conventional gas, oil or other fuel burner either of the power type or the atmospheric type both well know in the art. Burners suitable for this purpose are manufactured by Eclipse Fuel Engineering Co. of Rockford, Ill. Burner 18 forces flame into flame conduit 24 which may preferably be a hollow length of stainless steel or other heat resistant metallic material. The flame conduit traverses the lower end of the primary combustion chamber 12 from burner 18 through wall 58 to a position below flame tube 20 and, in operation, becomes heated to approximately 1,500° F. (glowing cherry red). The heated flame conduit ignites waste material deposited in the primary chamber 12. Air to support combustion in the primary chamber is provided through air ports 34 in the side walls 62 of the primary chamber. Air ports 34 communicate via fresh air channels 36 with air ducts 38 which open outside the incinerator and thus provide a continuous flow of air to the primary combustion chamber.

In order to prevent waste material from accumulating on the flame conduit 24 and adversely effecting the distribution of heat in the primary combustion chamber, the conduit 24 is provided with deflecting means on its upper surface. In a preferred arrangement the deflecting means may comprise a peaked roof section 24a integral with flame conduit 24 to deflect refuse to opposite sides of the flame conduit. In addition, the lower surface of primary combustion chamber 12 includes open grates 40 which retain solid waste material within the primary combustion chamber but permit ash to descend beneath the primary chamber into an appropriate ash receiving drawer 42. The ash drawer 42 includes a handle 64, a base 66 and side walls 68 and is adapted to slide in the lateral direction so as to be periodically removed through side door 94 and emptied in a conventional manner. The entire incinerator is supported by legs 70.

In addition to solid ash, combustion in the primary combustion chamber 12 produces a variety of combustion products. Among these are particles of fly ash, soot and other flying debris. In order to reduce the quantity of this material which is released into the atmosphere, incinerator 10 includes a contaminant supressing combustion product flow path shown by arrow A between the primary combustion chamber 12 and exit flue 22. Generally the path includes a water impingement surface 46 and a secondary combustion chamber 16 for receiving and igniting waste products from the primary combustion chamber, thus converting such products into harmless waste gases.

Figure 2:
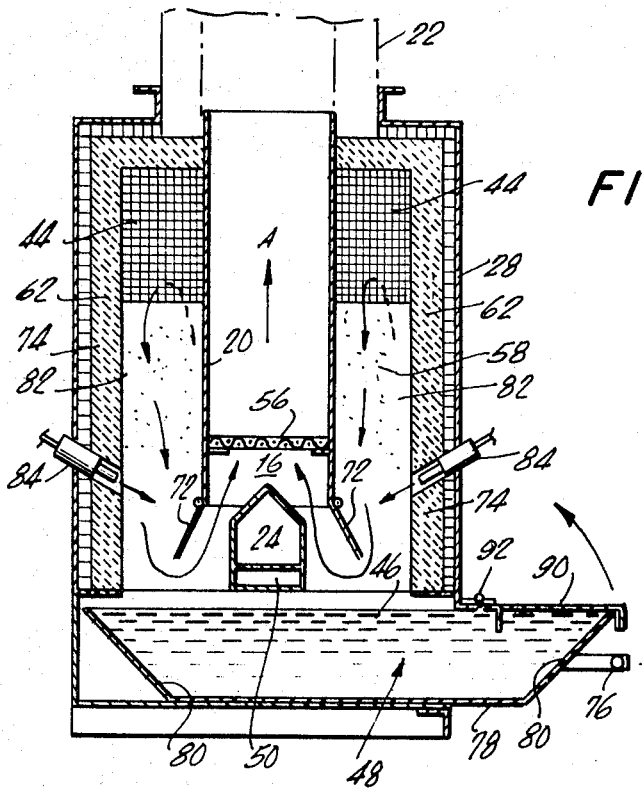
FIG. 2 is a cross-sectional front view of the incinerator of FIG. 1, taken along line 2-2 of FIG. 1 in the direction of the arrows.
Figure 3:
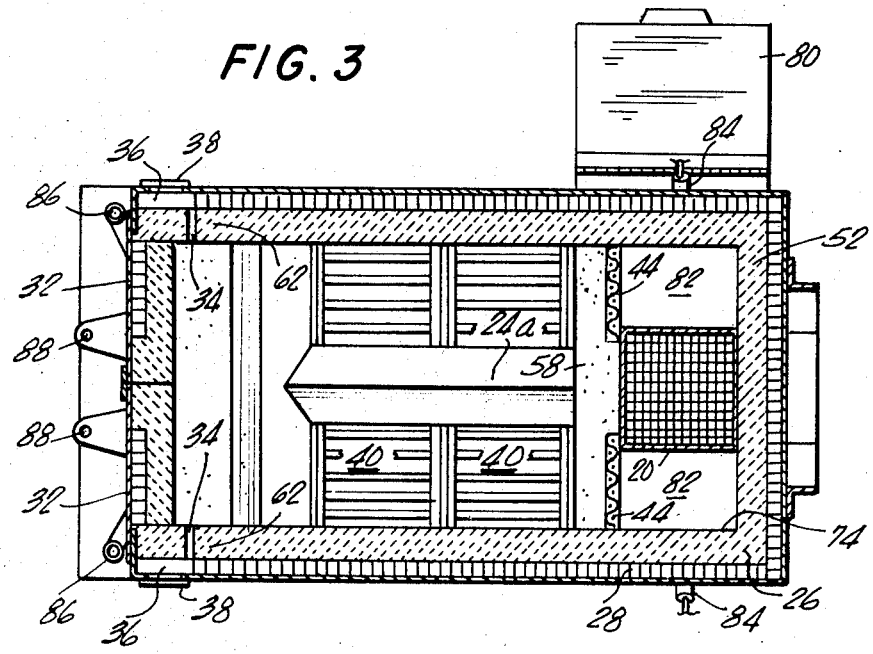
FIG. 3 is a plan view of the incinerator shown partly in section along line 3-3 in FIG. 1.
Figure 4:
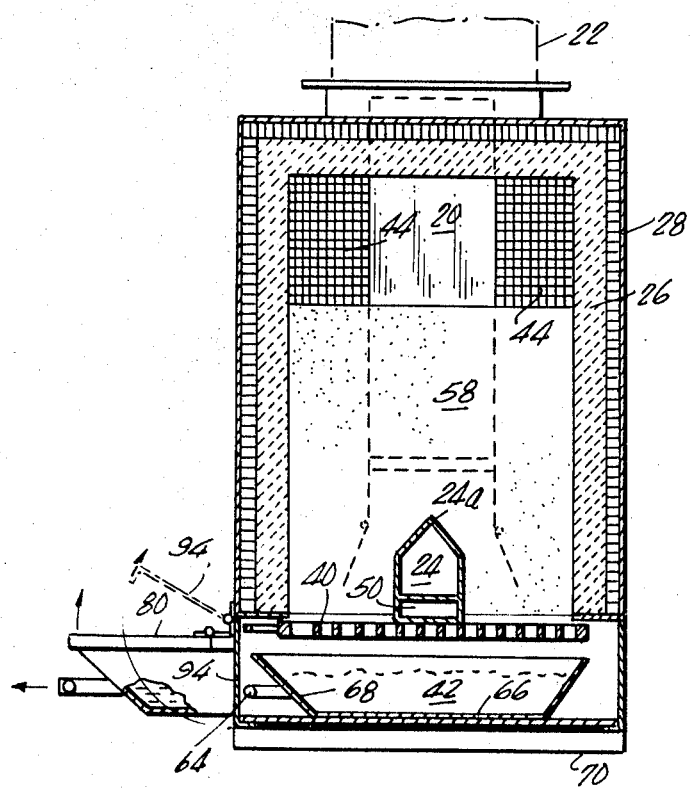
FIG. 4 is a cross sectional view of the incinerator taken along line 4-4 in FIG. 1 looking in the direction of the arrows.

Specifically, combustion products flow from primary chamber 12, up over dividing wall 58 through a screen trap 44 which retains larger pieces of fly ash in the primary combustion chamber, and down into channels 82 formed by sidewalls 62 and opposing sides of fire tube 20, as shown in FIG. 2. The flow of gaseous material is maintained by a draft established between the primary combustion chamber and exit flue 22 by the rapid exit of hot gases created by the flame exiting conduit 24. Gases and combustion products are thus drawn from primary combustion chamber 12 through screen 44 downward on opposite sides of fire tube 22 along channels 82 and then upward into the secondary combustion chamber 16 through fire tube 20 and adjacent to the open end of flame conduit 24 and this area is generally referred to as the secondary combustion chamber.

Flame tube 20 is preferably a hollow tube of rectangular or circular cross section and extends from adjacent the exit of flame conduit 24 to the flue 22. In order to facilitate the flow of gases, the entrance to flame tube 20 includes flared out sections 72 which help direct the upflowing gases into the flame tube. In addition, a fine suppressor screen 56 of Inconel or similar high temperature alloy is secured across the flame tube to help detain and ignite particles in the flow of combustion products. The entire flame tube assembly is secured adjacent to the rear incinerator wall 52.

In accordance with a preferred embodiment of the invention, a water impingement surface 46 may be provided just below the flame opening at the end of conduit 24 at the lower extremity of the secondary combustion chamber where the combustion product flow path A makes a sharp 180° turn. Hot gases and combustion products flowing out of primary combustion chamber 12 thus impinge on the water surface before being drawn up into the secondary combustion chamber. When loose fly ash makes contact with the water surface it becomes trapped and retained on the water surface.

The water impingement surface is provided by a water trough 48 which is mounted for sliding movement below the exit of flame conduit 24 at the rear of the incinerator. The trough includes a bottom member 78 and sidewalls and end walls 80 bonded together so as to retain a pool of liquid. The trough also includes a handle 76 to facilitate removal. The material trapped on the water surface eventually settles into the trough which is periodically cleaned. In a preferred embodiment of the invention trough 48 may include a section extending out the side of the incinerator chassis with a hinged top flap 90 pivotably secured at pin 92 so that the trough may be partially cleaned without removal. As an additional option, the incinerator may include water spray nozzles 84 protruding through sidewalls 62 and communicating with a source of water not shown. Nozzles 84 direct a spray of water across flow path A and onto flared out sections 72 thus trapping additional waste particles and carrying them down into trough 48.

On leaving the water impingement surface, the flow of hot gases including combustion products not retained by the water impingement surface or water spray travels up into the secondary combustion chamber 16 where these products are further ignited by the flame which exits flame conduit 24. To sustain burning in the secondary combustion chamber, air is drawn by the updraft created in fire tube 20 through a preheated air duct 50 which traverses the primary combustion chamber adjacent to flame conduit 24. The air duct 50 lies adjacent to the heated flame conduit 24 and thus air in the duct becomes preheated before entering the secondary combustion chamber 16. This helps sustain complete combustion by intensifying the temperature in the secondary chamber without using extra fuel.

In a normal sequence of use, double-leaf doors 32 would be opened and waste products would be deposited in the primary combustion chamber 12 through entryway 30. The charging doors would then be closed and burner 18 would be ignited. The burner forces flame through flame conduit 24 which traverses the lower end of the primary combustion chamber and opens beneath the secondary combustion chamber 16, fire tube 20 and flue 22. Flame conduit 24 becomes heated to a glowing red thus igniting waste material in the primary combustion chamber and deposition ash through grate 40 into ash drawer 42 which is periodically cleaned. Combustion products such as fly ash, soot, and smoke pass through deflector screen 44 over dividing wall 58 and into channels 82 on the opposite sides of flame tube 20. The gases flow down opposite sides of flame tube 20 and then up through the secondary combustion chamber 16 into the flame tube 20 and exit the incinerator by flue 22. At the point of entry into the secondary combustion chamber 16 there is a change of direction of the gas flow path A which traps fly ash on water surface 46. Such fly ash eventually settles into trough 48 where it may be conveniently removed from time to time. Secondary combustion in the lower portion of flame tube 20 generally designated 16 converts smoke, soot and other particles into nonvisible harmless gases which pass through flue 22 and exit the incinerator. The incinerator thus provides a clean efficient and consequently desirable mode of operation but is nonetheless economical and compact.

It is to be understood that the above-described arrangement is purely an example of the application of the principles of the invention. Other embodiments may be devised by those skilled in the art without departing from the spirit and scope of the invention.

I Claim:

1. An incinerator comprising a primary combustion chamber having an access opening for receiving waste material, a secondary combustion chamber communicating with said primary combustion chamber and receiving combustion products from said primary chamber, a flue exiting said secondary combustion chamber, a flame conduit situated in said primary combustion chamber and opening into said secondary combustion chamber, a flame source, and means directing said flame into said flame conduit so as to communicate heat from said flame to said primary combustion chamber to ignite waste material received in said primary chamber and through said conduit into said secondary combustion chamber to ignite said combustion products in said secondary combustion chamber, said combustion products passing out of said primary combustion chamber and downwardly adjacent the lateral sides of said secondary combustion chamber without traversing said flame, said products thereafter passing upwardly into said secondary combustion chamber.

2. An incinerator as defined in claim 1 further including an air duct defining an air passageway from the exterior of said incinerator into said secondary combustion chamber, said duct traversing a path adjacent to said flame conduit and being heated thereby so that air to support combustion in said secondary combustion chamber is delivered through said duct and is preheated before entering said secondary chamber by close contact with said flame conduit.

3. An incinerator as defined in claim 2 further including an ash drawer located beneath said primary combustion chamber, and a grate situated at the lower end of said primary combustion chamber over said ash drawer so that the residue of said waste material burned within said primary combustion chamber will fall through said grate into said ash drawer for periodic removal.

4. An incinerator as defined in claim 3 wherein said flame conduit passes over said grate and includes deflecting means for directing said ash away from said conduit and onto said grate.

5. An incinerator comprising a flame source and a chassis, said chassis defining a primary combustion chamber for receiving and burning waste material and a contaminant-suppressing flow path communicating with said primary combustion chamber and opening outside said chassis for receiving products of combustion from said primary combustion chamber and releasing relatively decontaminated gases into the atmosphere, said flow path including secondary combustion region having a flame tube adapted to enclose a flame for igniting said combustion products and producing relatively harmless waste gases and a flue exiting said incinerator over said flame tube, the rush of hot gases out of said flue creating an updraft which draws said combustion products from said primary chamber through said secondary combustion region, and a water impingement surface located beneath said flame tube, said flow path directing combustion products downward adjacent said flame tube so as to impinge upon said water surface adjacent the entrance to said secondary combustion region so that particulate matter in said products of combustion is retained on said water impingement surface.

6. An incinerator as defined in claim 5 wherein said secondary combustion chamber includes a mesh screen of high heat resistant material located across said flame tube.

7. An incinerator as defined in claim 6 wherein said flow path further includes a deflector screen at the entrance to said flow path adjacent said primary combustion chamber, said screen trapping relatively large particles within said primary combustion chamber.